Feb. 28, 1939.  W. J. ALLEN  2,148,921
GOVERNOR MECHANISM
Filed April 12, 1938
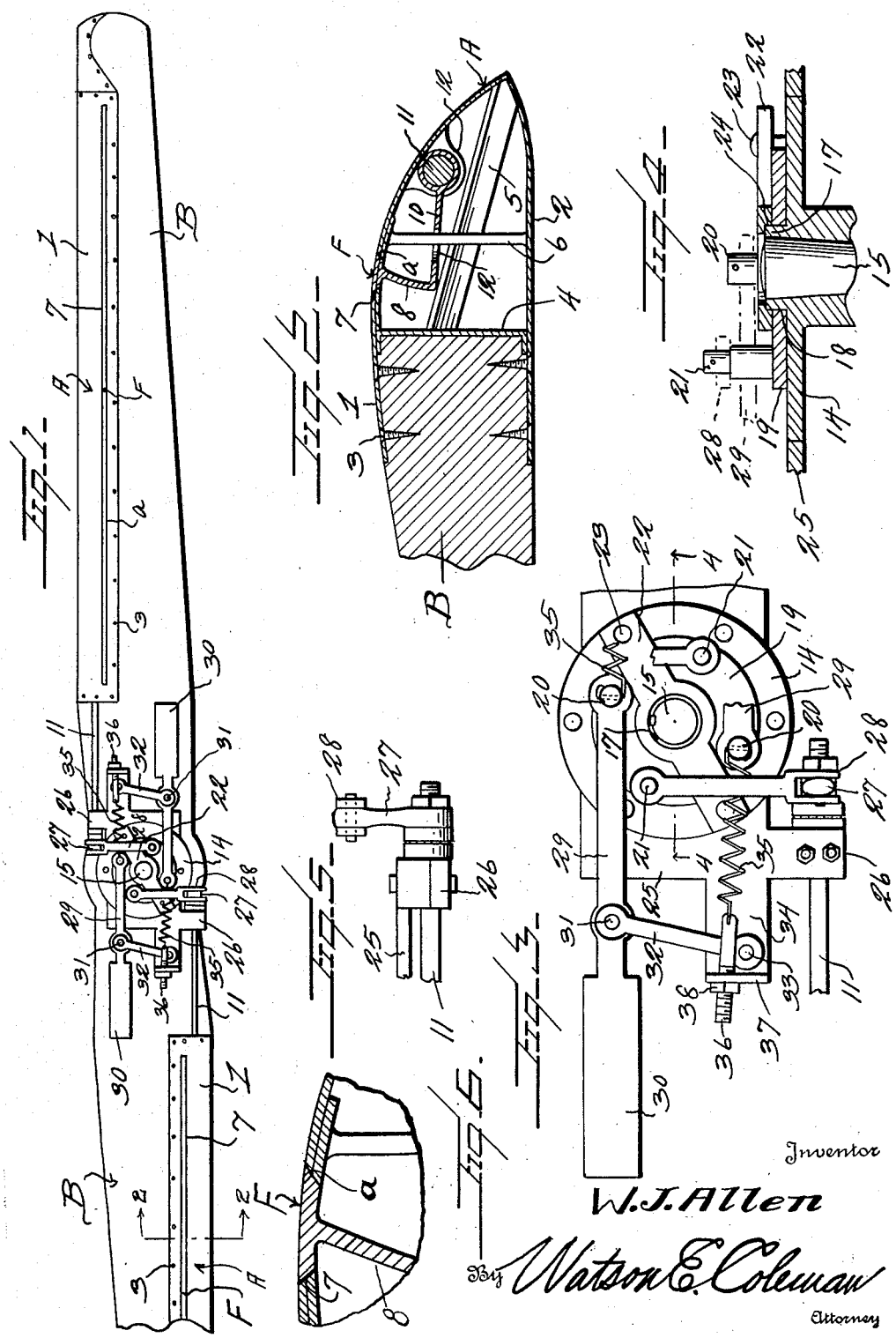
Inventor
W. J. Allen
By Watson E. Coleman
Attorney Patented Feb. 28, 1939

2,148,921

UNITED STATES PATENT OFFICE 2,148,921

GOVERNOR MECHANISM

Walter J. Allen, Salina, Kans.

Application April 12, 1938, Serial No. 201,635

6 Claims. (Cl. 170—68)

This invention relates to a governor mechanism for a wind driven propeller blade, and it is an object of the invention to provide a mechanism of this kind to regulate the speed at which the propeller turns and which by proper adjustment determines a predetermined speed of the propeller blade regardless of wind velocity.

The invention also has for an object to provide a mechanism of this kind which is particularly designed and adapted for use in connection with wind driven propellers used to generate electrical or mechanical power where it is necessary that the propeller revolve at a uniform speed in order to produce an even flow of power.

An additional object of the invention is to provide a mechanism of this kind including a floating valve governor member associated with the nose or leading edge portion of the blade and which valve governor member is adjustable to a position to eliminate vacuum being set up on the reverse side of the blade and thereby retard as desired the speed of rotation of the propeller regardless of wind velocity.

A further object of the invention is to provide a mechanism of this kind including a valve governor member carried by the nose or leading edge portion of a propeller blade together with operating means for said valve governor member which is mounted and assembled in a manner whereby is substantially eliminated inefficiency of operation as a result of varying weather conditions, such as dust or ice.

The invention consists in the details of construction and in the combination and arrangement of the several parts of my improved governor mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in elevation illustrating a propeller having applied thereto a governor mechanism constructed in accordance with an embodiment of my invention, one of the blades being in fragment;

Figure 2 is an enlarged fragmentary transverse sectional view taken substantially on the line 2—2 of Figure 1;

Figure 3 is an enlarged fragmentary view in elevation of the governor mechanism proper, the blades being omitted;

Figure 4 is a detailed sectional view taken substantially on the line 4—4 of Figure 3;

Figure 5 is a fragmentary elevational view of the inner end portion of a governor shaft;

Figure 6 is an enlarged fragmentary sectional view illustrating in detail the governor member and the seats therefor.

As disclosed in the accompanying drawing, B denotes oppositely disposed blades of a wind driven type such as is employed in the generation of electrical or mechanical power. The nose or leading edge portion of each of the blades B comprises a separate unit A of proper configuration and having upper and lower walls or plates 1 and 2 overlying top and bottom surfaces of the blade B proper and suitably anchored thereto by the screw members 3 or otherwise as may be preferred. Interposed between the plates or walls 1 and 2 at the rear part thereof and welded or otherwise secured thereto is a back plate 4 which has close contact with the front edge of the blade B proper. Interposed between this plate 4 and the outer or meeting end portions of the plates 1 and 2 are the strengthening or reinforcing bars 5 preferably angular in cross section. These bars 5 are suitably spaced lengthwise of the blade B and to further strengthen the unit A the rods 6 are interposed between and suitably fixed to the plates 1 and 2 and preferably at a point in advance of but in relatively close proximity to the elongated slot 7 extending substantially from one end of the upper plate 1 and having its longitudinal edges $a$ beveled to provide seats with which snugly engage the correspondingly beveled longitudinal marginal portions of the elongated floating governor member F. This governor member F is substantially coextensive in length with the length of the slot 7. The plates 1 and 2 are of desired curvature in cross section and the slot 7 is substantially parallel to the entering edge of the unit A.

The governor member F is provided therealong with a flange 8 which extends within the unit A through the slot 7 and this flange 8 has its marginal portion within the unit A continued by a laterally and forwardly directed plate 10 which is fixed to a shaft 11 for rocking movement therewith. This plate 10 at required points is provided with openings 12 through which are directed the brace rods 6, said openings being of such size to permit the plate 10 to freely rock with the shaft 11.

When the governor member F is in its lowermost position its outer surface is substantially flush with the outer surface of the plate 1 of the unit A and when in such position offers no effect upon the rotation of the blade B. However, upon raising or projecting of the governor member F the amount of vacuum allowed to be set up on the reverse side of the propeller can be governed to so retard the travel of the blade B to maintain a constant speed of rotation of the blade. It is believed to be obvious that the extent or height to which this governor member F is opened regulates, proportionately, the amount of such vacuum which in turn allows the propeller blade B to revolve at a set speed when the propeller blade B is under the influence of excessive wind velocity.

The shaft 11 hereinbefore referred to is rotatably supported by the suitably positioned bearings 12 and by having the major portion of the shaft 11 housed within the unit A there is eliminated the inefficiency which would be caused by weather conditions, such as dust or ice.

The blades B are associated in a well known way with an intermediate hub 14 preferably of steel and which, of course, is adapted to be mounted upon the power take-off shaft 15. This hub 14 is provided with an outstanding annular flange 17 concentric to the axial center of the hub. This flange snugly fits within a central opening 18 of an oscillating equalizing disk 19. At diametrically opposed points this disk 19 is provided with the outstanding short pins 20 and also with the diametrically opposed long pins 21. The pins 20 and 21 are alternately arranged and equidistantly spaced around the disk.

The disk 19, as herein disclosed, is held in place by the steel strap 22 extending laterally across the disk 19 and having its extremities held to the hub 14 by the hub bolts 23 or otherwise as may be preferred. The central portion of this strap 22 is formed to provide an annular recess 24 which snugly receives the outer portion of the flange 17.

Welded or otherwise fixedly secured to the hub 14 and adjacent the inner portion of each of the blades B is a governor frame 25. This frame 25 is provided with a bearing 26 for the extended inner portion of the shaft 11. This shaft 11 extends inwardly beyond the bearing 26 and has fixed thereto a rock arm 27, and operatively engaged with this rock arm 27 is an end portion of a rigid link 28 which has its opposite end portion operatively engaged with one of the long pins 21.

It is believed to be obvious that in accordance with the extent of rocking movement of the disk 19 together, of course, with the direction of rotation, the shaft 11 will be correspondingly and proportionately rocked to raise or lower the governor member F.

Operatively engaged with the short pins 20 are the inner portions of the elongated and oppositely disposed rods 29. These rods 29 are of desired length and have their outer portions suitably weighted, as at 30. Each of the arms 29 at a desired point outwardly from its inner end has pivotally engaged therewith, as at 31, an end portion of a supporting link 32 and the opposite end portion of this supporting link 32 is pivotally connected, as at 33, with an outwardly extended plate 34 of the frame 25.

The pins 20 have operatively connected thereto the extremities of the retractile members 35 herein disclosed as coil springs. These members 35 are oppositely disposed and the outer extremity of each of the members or springs 35 is operatively connected with a shank 36 disposed through a laterally disposed flange 37 carried by the outer end portion of the plate 34. Threading upon the shank 36 and contacting from without with the flange 37 is a nut 38. By proper manipulation of the nut 38 the shank 36 can be endwise adjusted to vary or regulate the tension of the associated member or spring 35 as may be required.

The members or springs 35 operate to constantly impose pull upon the disk 19 in a direction to urge the governor member valve F to its seat and also to regulate the outward swinging movement of the arms 29 when the blades B are revolving. As the blades B revolve the arms 29 due to their weighted outer end portions 30 will have a tendency to move outward and such outward movement will rotate the disk 19 in a direction to extend the governor members F and thus eliminate or reduce the vacuum at the rear side of the blades proportionately to the raising or outward movement of the governor members F and which movement, of course, is determined by the speed at which the blades B may rotate. This extent of outward or upward movement of the governor members F is determined by the adjustment of the springs 35. The blade B rotates slower when the governor members F are raised and faster as said members F are lowered.

While I have particularly described and illustrated my invention as used in connection with a wind driven propeller, it is to be stated that with but slight modification of what is hereinbefore disclosed my invention can be employed in connection with the wings of an aeroplane.

From the foregoing description it is thought to be obvious that a governor mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A wind driven propeller having a hollow nose or leading portion, the outer wall of said portion having a slot extending lengthwise of the blade, a rock shaft within said hollow nose or leading portion, a floating governor member extending within the hollow nose or leading portion through said slot and operatively connected with the rock shaft, and means for rocking the shaft to raise or lower the governor member.

2. A wind driven propeller having a hollow nose or leading portion, the outer wall of said portion having a slot extending lengthwise of the blade, a rock shaft within said hollow nose or leading portion, a floating governor member extending within the hollow nose or leading portion through said slot and operatively connected with the rock shaft, and means adjacent to the hub end portion of the blade for rocking the shaft to raise or lower the governor member.

3. A wind driven propeller comprising a hub and blades operatively associated with the hub, each of said blades having a hollow nose or leading portion with the outer wall of each of said portions being provided with a slot extending lengthwise of the blade, floating governor members extending within the hollow portions of the blades through the slots thereof, an operative connection between said governor members, and rock shafts for raising and lowering the governor members upon rocking of the shafts, a disk rotatably carried by the hub, rock arms carried by the inner end portions of the shafts, links connecting said rock arms and the disk at equidistantly spaced points around the disk, elongated weighted rods operatively secured to the disk, endwise movement of the rods rotating the disk in a direction to rock the shafts.

4. A wind driven propeller comprising a hub and blades operatively associated with the hub, each of said blades having a hollow nose or leading portion with the outer wall of each of said portions being provided with a slot extending lengthwise of the blade, floating governor members extending within the hollow portions of the blades through the slots thereof, an operative connection between said governor members, and rock shafts for raising and lowering the governor members upon rocking of the shafts, a disk rotatably carried by the hub, rock arms carried by the inner end portions of the shafts, links connecting said rock arms and the disk at equidistantly spaced points around the disk, elongated weighted rods operatively secured to the disk, endwise movement of the rods rotating the disk in a direction to rock the shafts, and means for controlling the outward endwise movement of the rods.

5. A wind driven propeller comprising a hub and blades operatively associated with the hub, each of said blades having a hollow nose or leading portion with the outer wall of each of said portions being provided with a slot extending lengthwise of the blade, floating governor members extending within the hollow portions of the blades through the slots thereof, an operative connection between said governor members, and rock shafts for raising and lowering the governor members upon rocking of the shafts, a disk rotatably carried by the hub, rock arms carried by the inner end portions of the shafts, links connecting said rock arms and the disk at equidistantly spaced points around the disk, elongated weighted rods operatively secured to the disk, endwise movement of the rods rotating the disk in a direction to rock the shafts, and tensioning means for limiting the outward movement of the rods.

6. A wind driven propeller comprising a hub and blades operatively associated with the hub, each of said blades having a hollow nose or leading portion with the outer wall of each of said portions being provided with a slot extending lengthwise of the blade, floating governor members extending within the hollow portions of the blades through the slots thereof, an operative connection between said governor members, and rock shafts for raising and lowering the governor members upon rocking of the shafts, a disk rotatably carried by the hub, rock arms carried by the inner end portions of the shafts, links connecting said rock arms and the disk at equidistantly spaced points around the disk, elongated weighted rods operatively secured to the disk, endwise movement of the rods rotating the disk in a direction to rock the shafts, and means for variably regulating the outward movement of the rods.

WALTER J. ALLEN.